(12) United States Patent
Ahn et al.

(10) Patent No.: US 8,132,193 B2
(45) Date of Patent: Mar. 6, 2012

(54) DISK EJECTING UNIT AND OPTICAL DISK DEVICE INCLUDING THE SAME

(75) Inventors: Cheol-woong Ahn, Seoul (KR); Un-jin Choi, Suwon-si (KR); Jeong-hun Yeom, Seongnam-si (KR); Sung-hun Lee, Hwaseong-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 571 days.

(21) Appl. No.: 12/354,832

(22) Filed: Jan. 16, 2009

(65) Prior Publication Data

US 2009/0199223 A1 Aug. 6, 2009

(30) Foreign Application Priority Data

Feb. 1, 2008 (KR) .................. 10-2008-0010739

(51) Int. Cl.
*G11B 17/04* (2006.01)
(52) U.S. Cl. ......... 720/617; 365/619; 365/609; 365/623
(58) Field of Classification Search ................... 720/617, 720/619, 609, 623
See application file for complete search history.

(56) References Cited

U.S. PATENT DOCUMENTS

| | | | | |
|---|---|---|---|---|
| 5,799,783 A | * | 9/1998 | Cheris et al. | 206/308.1 |
| 6,266,311 B1 | * | 7/2001 | Song et al. | 720/609 |
| 7,831,983 B2 | * | 11/2010 | Ahn et al. | 720/623 |
| 7,908,612 B2 | * | 3/2011 | Yang et al. | 720/619 |

FOREIGN PATENT DOCUMENTS

| | | |
|---|---|---|
| JP | 07-153161 | 6/1995 |
| JP | 10-31854 | 2/1998 |
| JP | 10-334553 | 12/1998 |
| JP | 2000-306307 | 11/2000 |
| KR | 97-50268 | 8/1997 |
| KR | 1999-0031247 | 5/1999 |
| KR | 10-2000-0027308 | 5/2000 |
| KR | 100699748 | 3/2007 |
| KR | 1020080005090 | 1/2008 |

* cited by examiner

*Primary Examiner* — Connie Yoha
(74) *Attorney, Agent, or Firm* — NSIP Law

(57) ABSTRACT

A disk ejecting unit to manually ejecting a disk and a disk device including the disk ejecting unit are provided. A disk ejecting unit for use in a disk device for recording and/or reproducing data with respect to a disk, includes a driving motor, a slider that moves toward a first position or a second position in response to a driving force of the driving motor, an eject lever to press the disk inserted into the disk device so as to eject the disk where the slider is moved toward the second position, and a gear assembly to transmit the driving force of the driving motor to the slider.

31 Claims, 13 Drawing Sheets

DISK EJECTING UNIT AND OPTICAL DISK DEVICE INCLUDING THE SAME

CROSS-REFERENCE TO RELATED PATENT APPLICATION

This application claims the benefit under 35 U.S.C. §119 (a) of a Korean Patent Application No. 10-2008-0010739, filed on Feb. 1, 2008 in the Korean Intellectual Property Office, the disclosure of which is incorporated herein in its entirety by reference.

TECHNICAL FIELD

The following description relates to a disk device, and more particularly, to a disk ejecting unit to manually eject a disk where the disk is not unloaded and an optical disk device including the disk ejecting unit.

BACKGROUND

Optical disks are widely used as a form of information storage media because of their large information storage capacity and cost effectiveness. Optical disks may be classified according to the information storage capacity and include, for example, compact disks (CDs) and digital versatile disks (DVDs). Examples of optical disks allowing writing, deleting, and reproducing data include 650 MB CD-R, CD-RW, 4.7 GB DVD-R, DVD+R, DVD-RW, and DVD+RW. Furthermore, HD-DVDs and blue-ray disks having a 20-GB capacity or higher have been developed.

Optical disks have been used as information storage media for portable electronic devices such as laptop computers or camcorders by incorporating therein optical disk device(s) for recording and/or reproduction. However, there may be problems associated with some of the conventional optical disk devices. For example, where a conventional optical disk device is large, it may be difficult to carry the optical disk device or portable electronic device incorporating the optical disk device. While a slimmer optical disk device is available for portable electric devices, it may be inconvenient to insert or eject a disk into or from the conventional slim optical disk device.

Optical disk devices using a tray-loading mechanism load a disk onto a cassette or a tray, whereas optical disk devices using a slot-loading mechanism automatically slide a disk into a slot that is formed in a front surface of the optical disk devices and has a size as large as the diameter of the disk. The optical disk devices using the slot-loading mechanism may be preferable for use in portable electronic devices than the optical disk devices using the tray-loading mechanism.

Where an optical disk device is out of order, an operating system of a computer in which the optical disk device is installed malfunctions, or a battery of a notebook computer in which the optical disk device is installed runs out, a disk may need to be ejected manually. A structure in which a disk may be manually ejected in case of emergency is particularly needed for optical disk devices using a slot-loading mechanism in which the disk is automatically loaded and unloaded. Accordingly, there is a need for a structure to manually eject a disk, and in particular, a disk ejecting structure suitable for thin optical disk devices.

SUMMARY

According to an aspect, there is provided a disk ejecting unit for a slim optical disk device using a slot-loading mechanism.

According to another aspect, there is provided a disk ejecting unit for use in an optical disk device, comprising a driving motor, a main slider that moves linearly toward a front surface or a rear surface of the optical disk device in response to a driving force of the driving motor, an eject lever to compress a disk which is inserted into the optical disk device so as to eject the disk where the main slider is moved toward the rear surface of the optical disk device, and a gear assembly to transmit the driving force of the driving motor to the main slider.

The gear assembly may comprise a worm gear formed on a driving shaft of the driving motor, a rack gear formed on the main slider, a plurality of driven gears disposed between the worm gear and the rack gear, and a gear bracket that supports one of the plurality of driven gears, is movable between a first position in which all of the plurality of driven gears are successively engaged with one another and a second position in which an engagement between at least one pair of adjacent driven gears is released, is elastically biased in a direction in which the gear bracket is kept at the first position, and is moved to the second position by means for pushing the main slider toward the rear surface of the optical disk device.

The gear bracket may be pivotable between the first position and the second position about an axis that is parallel to a rotation axis of the disk.

The plurality of driven gears may comprise a first driven gear engaged with the worm gear and a second driven gear engaged with the first driven gear, wherein the second driven gear is supported by the gear bracket.

A pivot axis of the gear bracket may be the same as a rotation axis of the first driven gear.

The plurality of driven gears may further comprise a third driven gear engaged with the second driven gear and a fourth driven gear engaged with the third driven gear and the rack gear, wherein, where the gear bracket is in the second position, the engagement between the second driven gear and the third driven gear is released.

The gear bracket may be translatable between the first position and the second position.

The plurality of driven gears may comprise a first driven gear engaged with the worm gear and a second driven gear engaged with the first driven gear, wherein the second driven gear is supported by the gear bracket.

Where the gear bracket is in the second position, the engagement between the first driven gear and the second driven gear may be released.

The gear bracket may be elastically biased by a spring, and the spring may have one end supported by a chassis that supports the main slider and the other end supported by the gear bracket.

The gear bracket may comprise an inclined surface that is located in an entrance path of the pushing means where the gear bracket is in the first position, and is removed from the entrance path where the gear bracket is compressed by the pushing means toward the second position.

According to still another aspect, there is provided an optical disk device for recording and/or reproducing data with respect to a disk, comprising a housing comprising a front surface having a slot through which the disk is inserted or ejected and an eject hole into which means for manually ejecting the inserted disk is inserted, a main unit comprising a turntable to rotate the disk and an optical pickup to write and/or read the data with respect to the disk, and a disk ejecting unit to manually eject the disk that is inserted into the housing.

The disk ejecting unit may comprise a driving motor, a main slider that moves linearly toward the front surface or a rear surface of the housing in response to a driving force of the driving motor, an eject lever to compress the disk so as to eject the disk inserted into the housing from the housing where the main slider is moved toward the rear surface, and a gear assembly to transmit the driving force of the driving motor to the main slider.

The gear assembly may comprise a worm gear formed on a driving shaft of the driving motor, a rack gear formed on the main slider, a plurality of driven gears disposed between the worm gear and the rack gear, and a gear bracket that supports one of the plurality of driven gears, is movable between a first position in which all of the plurality of driven gears are successively engaged with one another and a second position in which an engagement between at least one pair of adjacent driven gears is released, is elastically biased in a direction in which the gear bracket is kept at the first position, and is moved to the second position by the ejecting means that is inserted through the eject hole.

According to yet another aspect, there is provided a disk ejecting unit for use in a disk device for recording and/or reproducing data with respect to a disk, the disk ejecting unit comprising a driving motor, a slider that moves toward a first position or a second position in response to a driving force of the driving motor, and toward the second position in response to being manually moved, an eject lever to press the disk inserted into the disk device so as to eject the disk where the slider is moved toward the second position, and a gear assembly to transmit the driving force of the driving motor to the slider.

The slider may be manually moved toward the second position in response to being pressed by means for pushing the slider through an eject hole provided to the disk device.

The gear assembly may comprise a worm gear formed on a driving shaft of the driving motor, a rack gear formed on the main slider, a plurality of driven gears disposed between the worm gear and the rack gear, and a gear bracket that supports one of the plurality of driven gears, is movable between a first position in which all of the plurality of driven gears are successively engaged with one another and a second position in which an engagement between at least one pair of adjacent driven gears is released, is elastically biased in a direction in which the gear bracket is kept at the first position of the gear bracket, and is moved to the second position of the gear bracket by means for pushing the slider toward the second position of the slider.

The disk device may be an optical disk device for recording and/or reproducing the data with respect to the disk, which uses a slot-loading mechanism to load or unload the disk.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, unless otherwise described, the same drawing reference numerals will be understood to refer to the same elements, features, and structures. The elements may be exaggerated for clarity and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Figure 1:
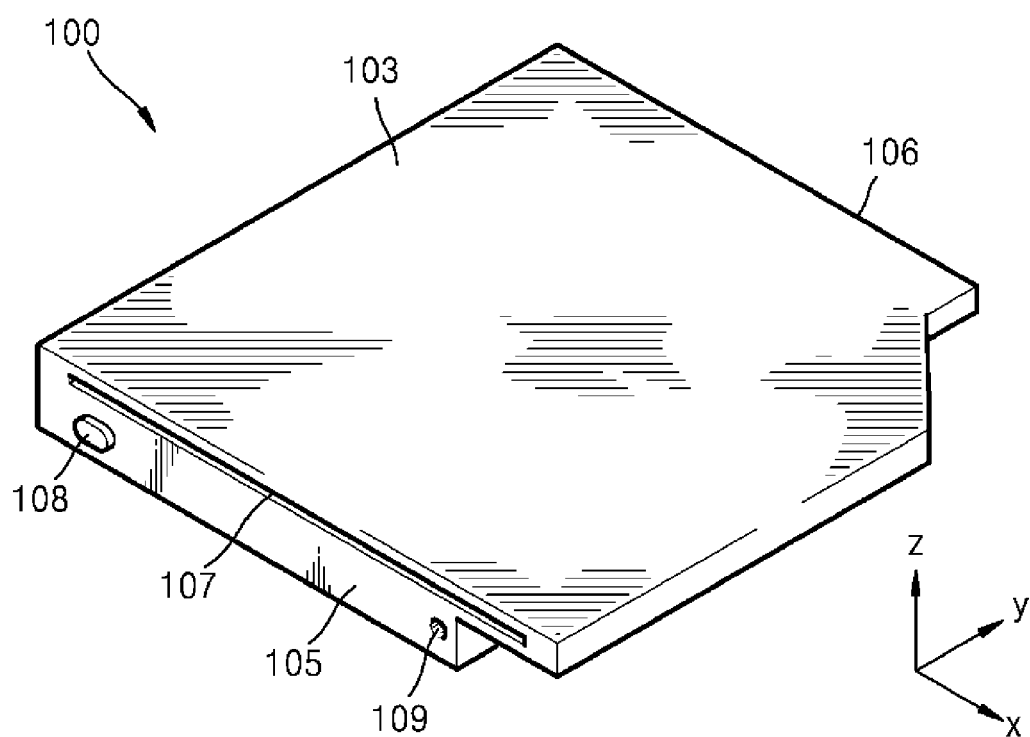
FIG. 1 is a perspective view illustrating an outward appearance of an optical disk device according to an exemplary embodiment.

FIG. 1 shows an outward appearance of an optical disk device 100 according to an exemplary embodiment. Referring to FIG. 1, the optical disk device 100 includes a housing including a base 101 (see FIG. 2) and a cover 103 coupled to the base 101. A slot 107, through which a disk D (see FIG. 2) is inserted or ejected, an eject button 108, and an eject hole 109 are formed in a front surface 105 of the housing. Where the eject button 108 is pressed, the disk D loaded in the optical disk device 100 is unloaded from the optical disk device 100. For example, where power supply is cut off while the disk D is loaded in the optical disk device 100, or in case of emergency where the disk D is not smoothly ejected even though power supply is not cut off, the disk D may be unloaded by inserting, for example, a pin 5 (see FIG. 7A) into the eject hole 109 and moving a main slider 141 (see FIG. 4). As an illustration, the optical disk device 100 may be installed in a portable electronic device such as a notebook computer.

Figure 2:
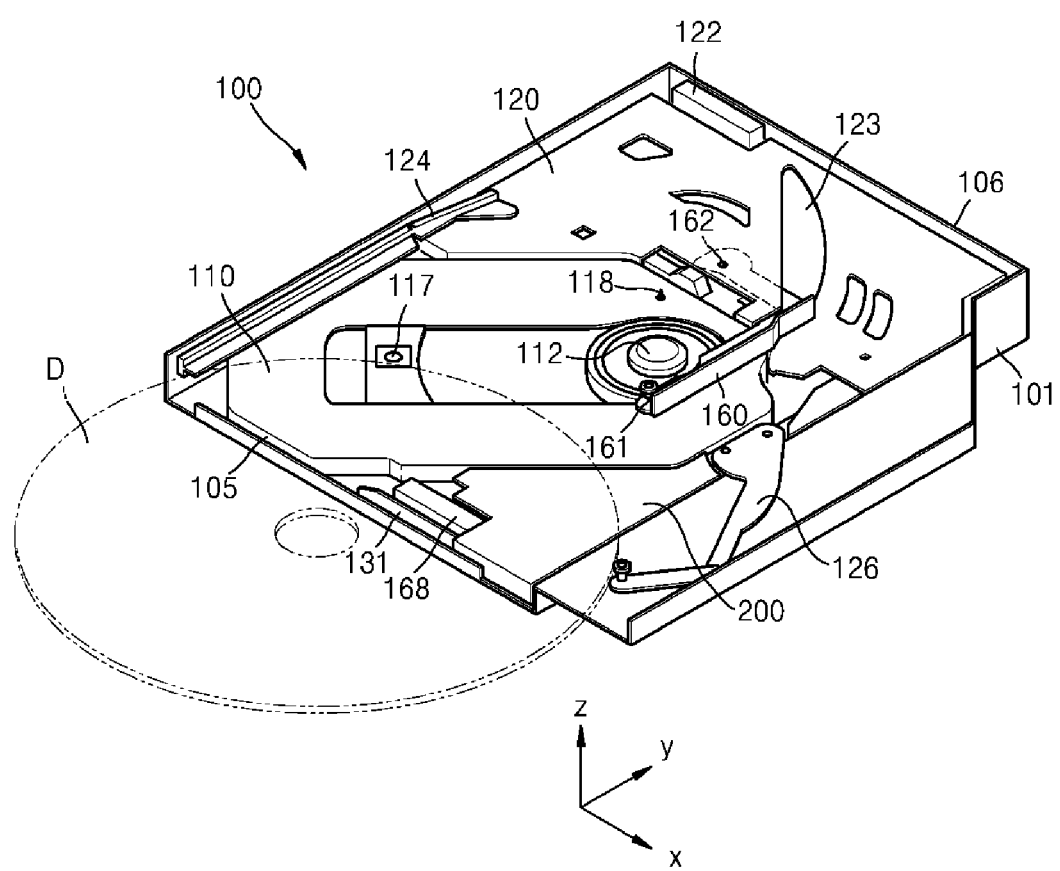
FIG. 2 is a perspective view illustrating a case where a disk is inserted through a slot formed in a front surface of the optical disk device of FIG. 1.
Figure 3:
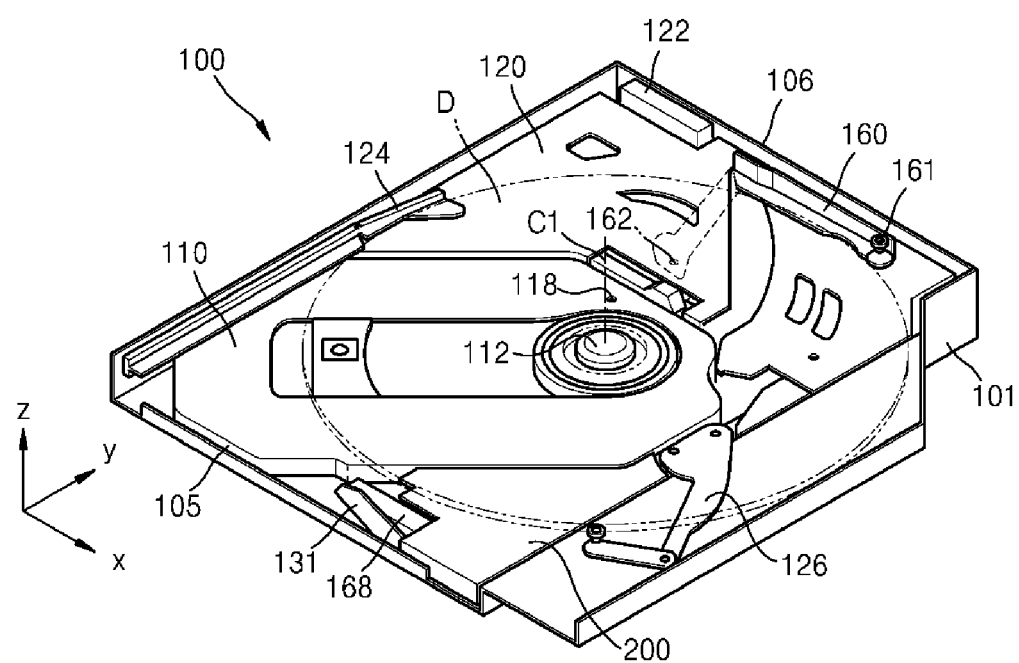
FIG. 3 is a perspective view illustrating a case where the disk is completely chucked on a turntable of the optical disk device of FIG. 2.

FIG. 2 shows a case where the disk D is inserted through the slot 107 formed in the front surface 105 of the optical disk device 100 of FIG. 1. FIG. 3 shows a case where the disk D is completely chucked on a turntable 112 of the optical disk device of FIG. 2.

Referring to FIGS. 2 and 3, the optical disk device 100 includes in the housing a main unit 110, a loading lever 126, an eject lever 160, and a disk guide 124. The main unit 110 includes the turntable 112 on which the disk D is mounted, a spindle motor (not shown) to rotate the turntable 112 at a predetermined speed(s), an optical pickup 117 to write or read data to or from the disk D by emitting light to the disk D, and a feeding motor (not shown) to move the optical pickup 117 in a tracking direction of the disk D.

The loading lever 126 urges the disk D toward a position where the center of the disk D inserted through the slot 107 (see FIG. 1) is aligned with the turntable 112. The loading lever 126 is pivotably supported by a second chassis 200 that supports the main slider 141 (see FIG. 4), and is moved in conjunction with a linear movement of the main slider 141 in a y-direction (see FIG. 4). Where the disk D is inserted through the slot 107 (see FIG. 1), the eject lever 160 escapes to a rear surface 106 of the optical disk device 100 so as to not obstruct the loading of the disk D as shown in FIG. 3. Where the eject button 108 (see FIG. 1) is pressed, the eject lever 160 is pivoted clockwise about a pivot axis 162 such that the disk D is ejected through the slot 107 (see FIG. 1). The eject lever 160 is pivotably supported by a first chassis 120, and is elastically biased so that an end 161 of the eject lever 160 is located close to the turntable 112. The disk guide 124 guides the disk D that is inserted into or ejected from the optical disk device 100.

Where the center of the disk D inserted through the slot 107 (see FIG. 1) is aligned with the turntable 112, the main unit 110 is lifted, an unchucking rod 118 ejected from the base 101 is hidden by the main unit 110, and the disk D is chucked on the turntable 112. However, where the eject button 108 (see FIG. 1) is pressed, the main unit 110 is lowered, the unchucking rod 118 is shown up from the main unit 110, and the disk D is unchucked from the turntable 112. The up-and-down movement of the main unit 110 is carried out in a coordinated manner with the movement of an interlocking slider 150 (see FIG. 4) in an x-direction, wherein the movement of the interlocking slider 150 in the x-direction is carried out in a coordinated manner with the movement of the main slider 141 (see FIG. 4) in the y-direction.

Figure 4:
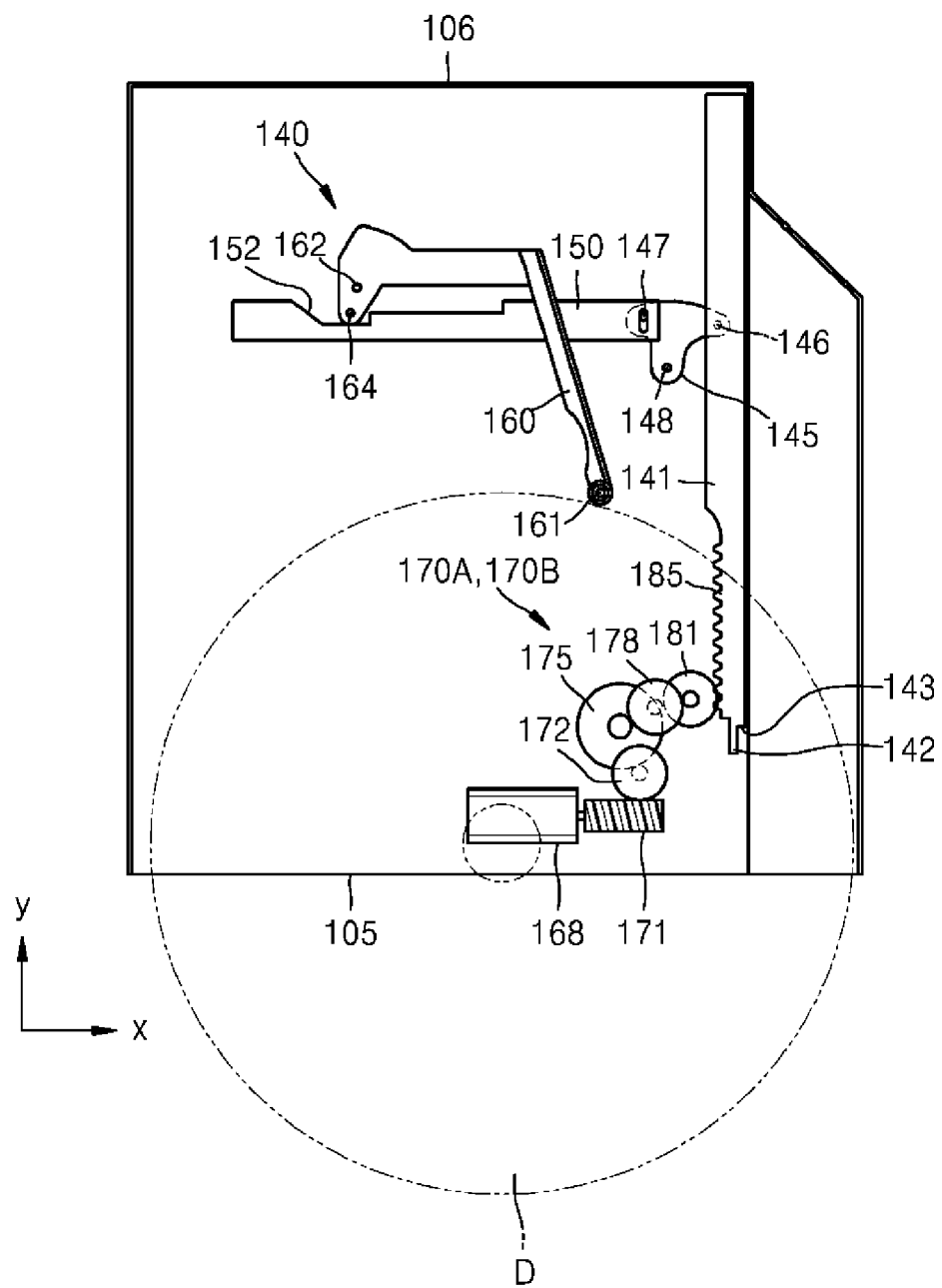
FIG. 4 is a plan view of a disk ejecting unit of the optical disk device of FIG. 2, illustrating that a main slider is moved to a rear surface.
Figure 5:
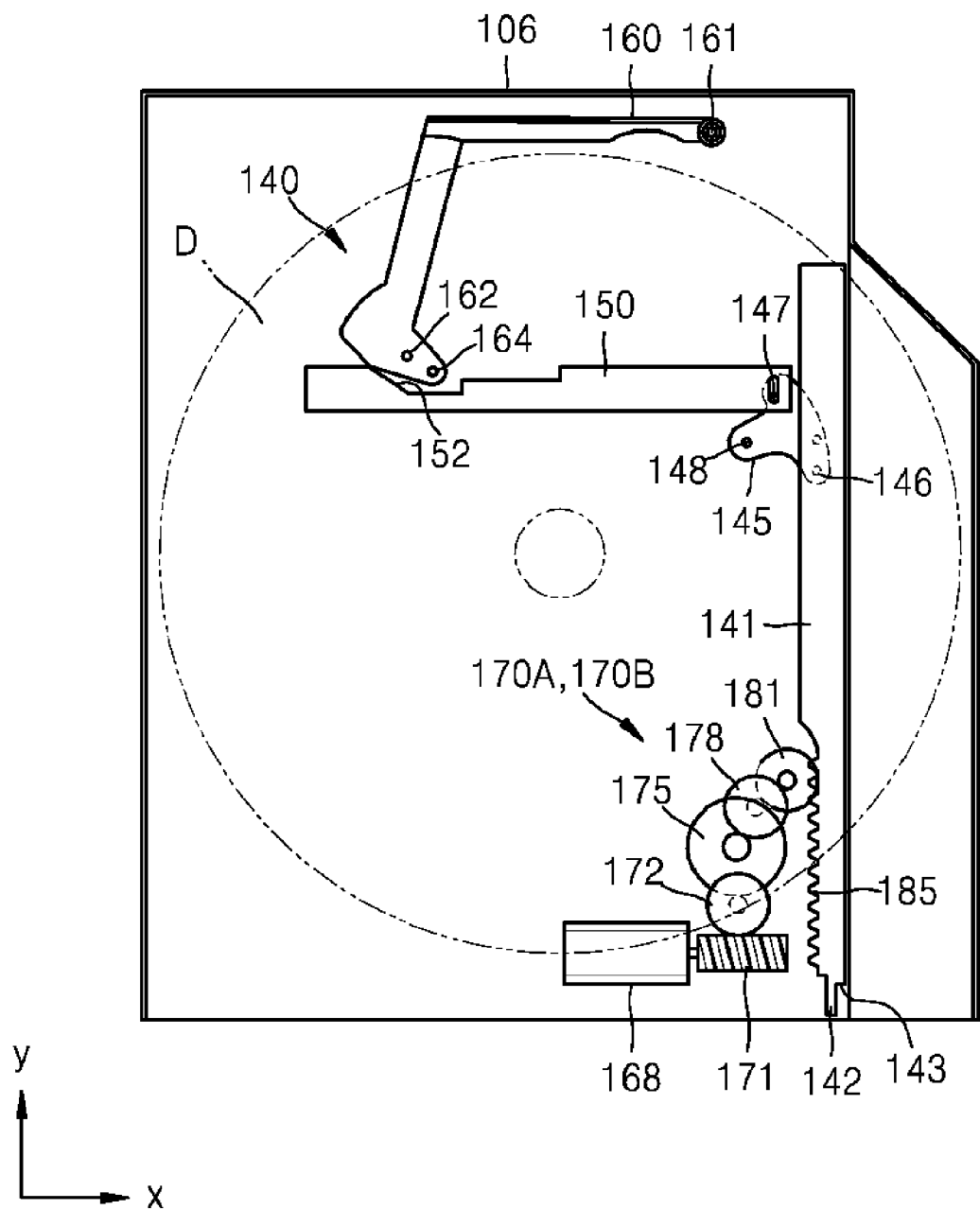
FIG. 5 is a plan view of the disk ejecting unit of the optical disk device of FIG. 2, illustrating that the main slider is moved to the front surface.

As the movement of a shutter 131 is carried out in a coordinated manner with the movement of the main slider 141 (see FIG. 4), the slot 107 (see FIG. 1) is opened and closed. That is, where the disk D is loaded on the optical disk device 100, the main slider 141 is moved toward the front surface 105 of the optical disk device 100 as shown in FIG. 5 and the shutter 131 is pushed upward by a pusher 142 located at an end of the main slider 141, thereby closing the slot 107 (see FIG. 1). However, where the disk D is unloaded from the optical disk device 100, the main slider 141 is moved toward the rear surface 106 of the optical disk device 100 as shown in FIG. 4 and the pusher 142 does not push the shutter 131, thereby opening the slot 107 (see FIG. 1). An opening 123 formed in the first chassis 120 is large enough to pivot the eject lever 160. A connector 122 connects the optical disk device 100 to an electronic device such as a main board of a computer.

FIGS. 4 and 5 show a disk ejecting unit 140 of the optical disk device of FIG. 2, according an exemplary embodiment. FIG. 4 illustrates a case where the main slider 141 is moved to the rear surface 106, and FIG. 5 illustrates a case where the main slider 141 is moved to the front surface 105 (see FIG. 4).

Referring to FIGS. 4 and 5, the disk ejecting unit 140 to manually eject the disk D loaded on the optical disk device 100 includes a driving motor 168, the main slider 141 linearly moved in the y-direction by a driving force of the driving motor 168, the eject lever 160 to compress the disk D so as to eject the disk D from the optical disk device 100 where the main slider 141 is moved to the rear surface 106 of the optical disk device 100, and a gear assembly 170A to transmit the driving force of the driving motor 168 to the main slider 141.

The linear movement of the main slider 141 in the y-direction is changed into a clockwise or counterclockwise rotation by a connecting lever 145 that is supported by the base 101 (see FIG. 2) to pivot about a pivot axis 148, and the interlocking slider 150 connected to the connecting lever 145 is linearly moved in the x-direction. A boss 146 is formed on the connecting lever 145 to connect between the connecting lever 145 and the main slider 141, and a boss 147 is formed on the connecting lever 145 to connect between the connecting lever 145 and the interlocking slider 150.

Referring to FIG. 4, as the main slider 141 is moved toward the rear surface 106 of the optical disk device 100, the interlocking slider 150 is moved away from the main slider 141. In this case, since a guide surface 152 of the interlocking slider 150 does not interfere with a projection 164 that is formed adjacent to the pivot axis 162 of the eject lever 160, the eject lever 160 that is in an elastically biased state is kept at a position that allows the disk D to be ejected from the optical disk device 100. However, referring to FIG. 5, as the main slider 141 is moved toward the front surface 105 (see FIG. 4) of the optical disk device 100, the interlocking slider 150 is moved toward the main slider 141. In this case, since the guide surface 152 interferes with the projection 164 of the eject lever 160, the eject lever 160 pivots counterclockwise about the pivot axis 162. Hence, the eject lever 160 escapes toward the rear surface 106 so as not to obstruct the loading of the disk D.

Figure 6:
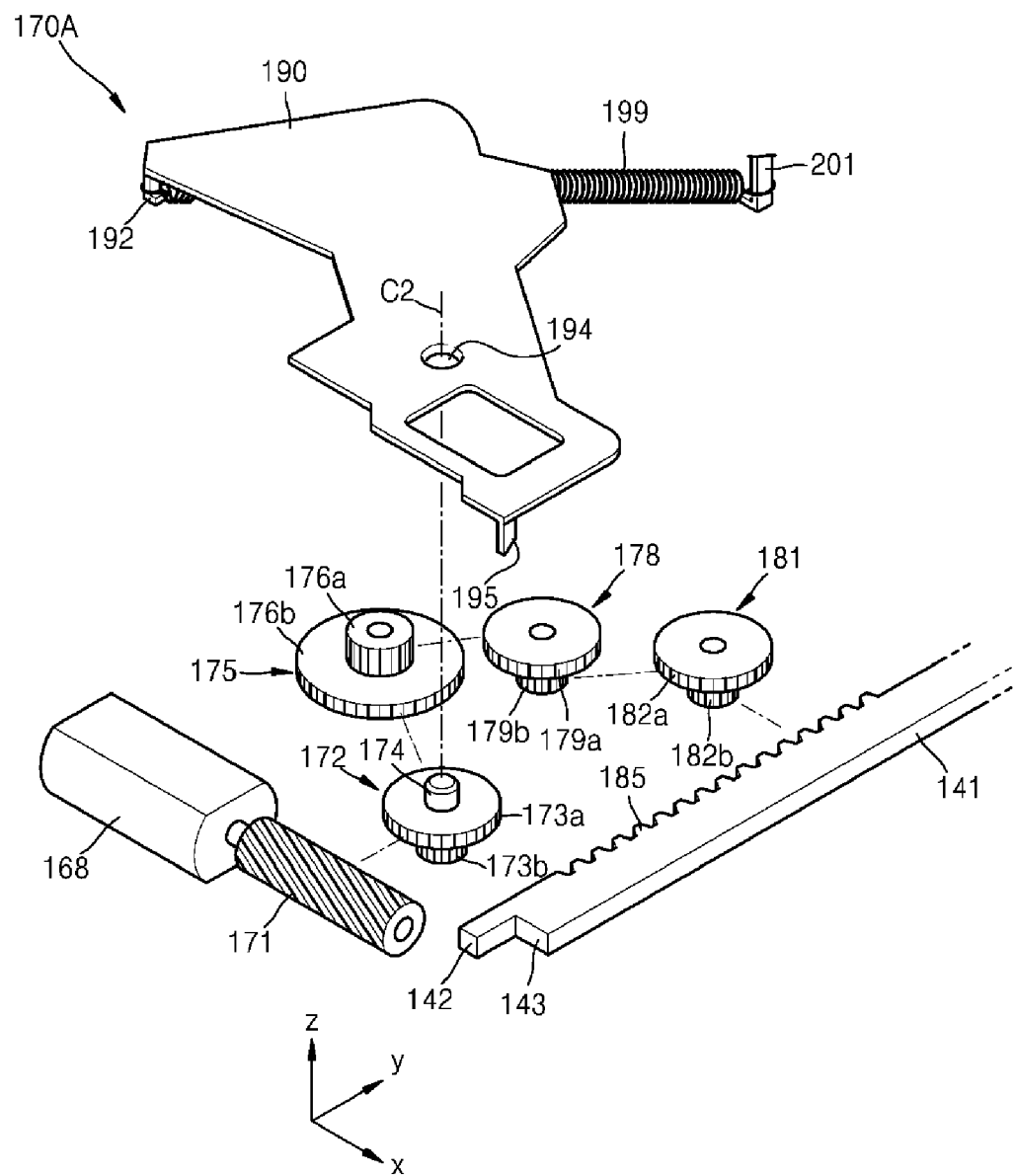
FIG. 6 is an exploded perspective view of a gear assembly according to an exemplary embodiment.
Figure 7A:
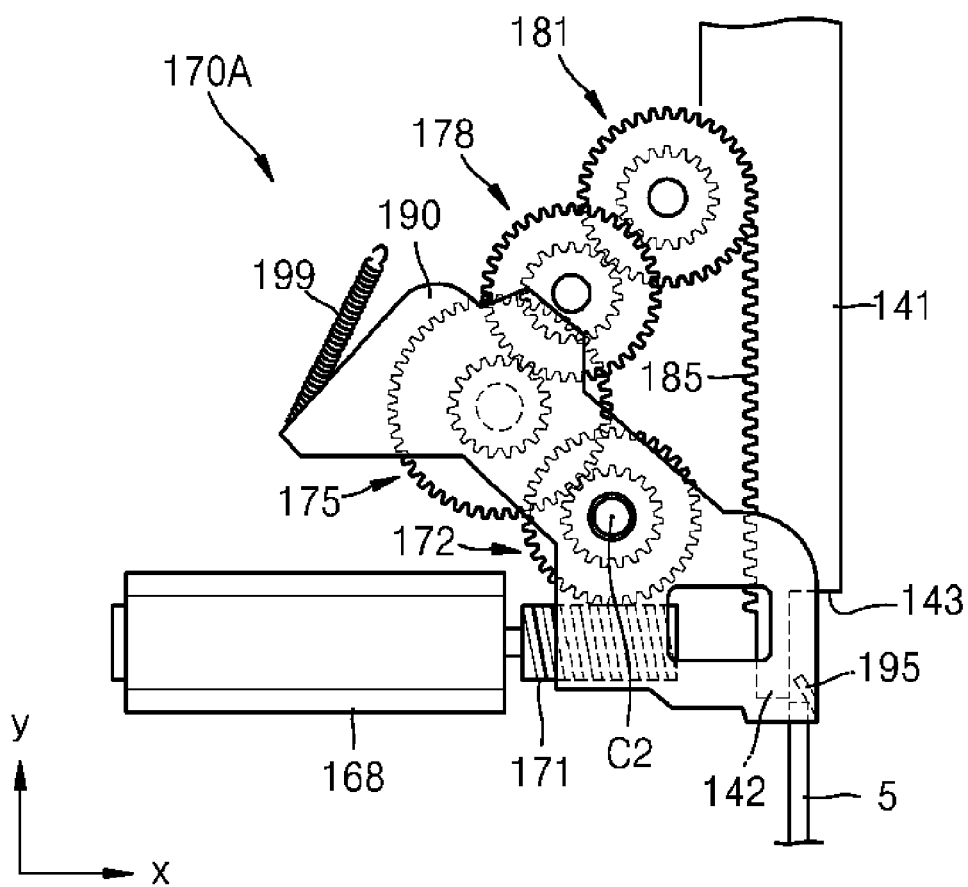
FIGS. 7A through 7C are plan views sequentially illustrating an operation of the gear assembly of FIG. 6 according to an exemplary embodiment.
Figure 7B:
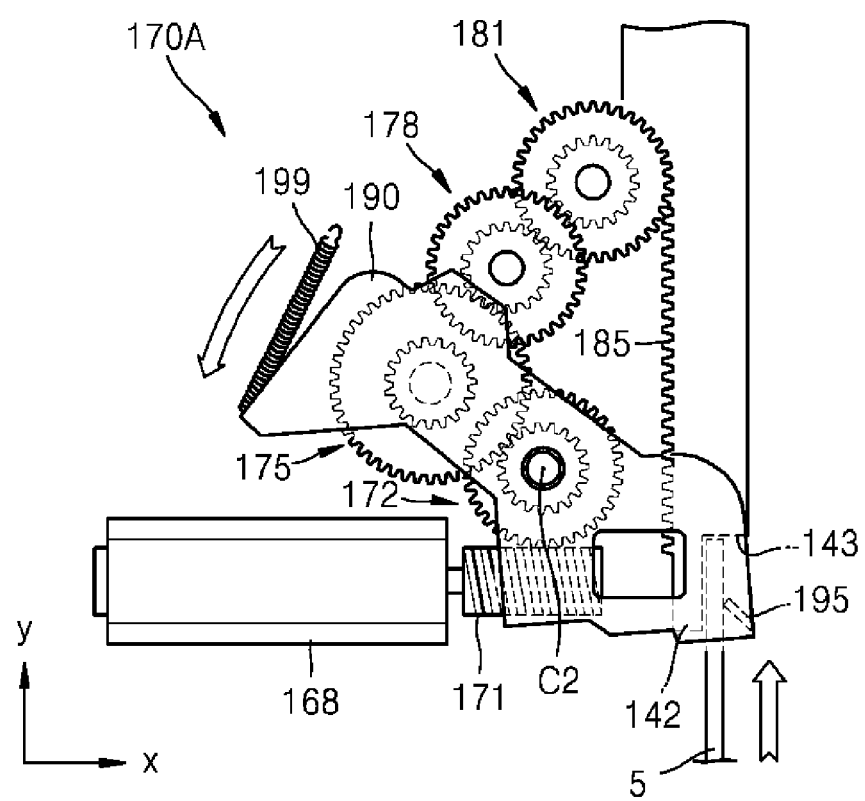
Figure 7C:
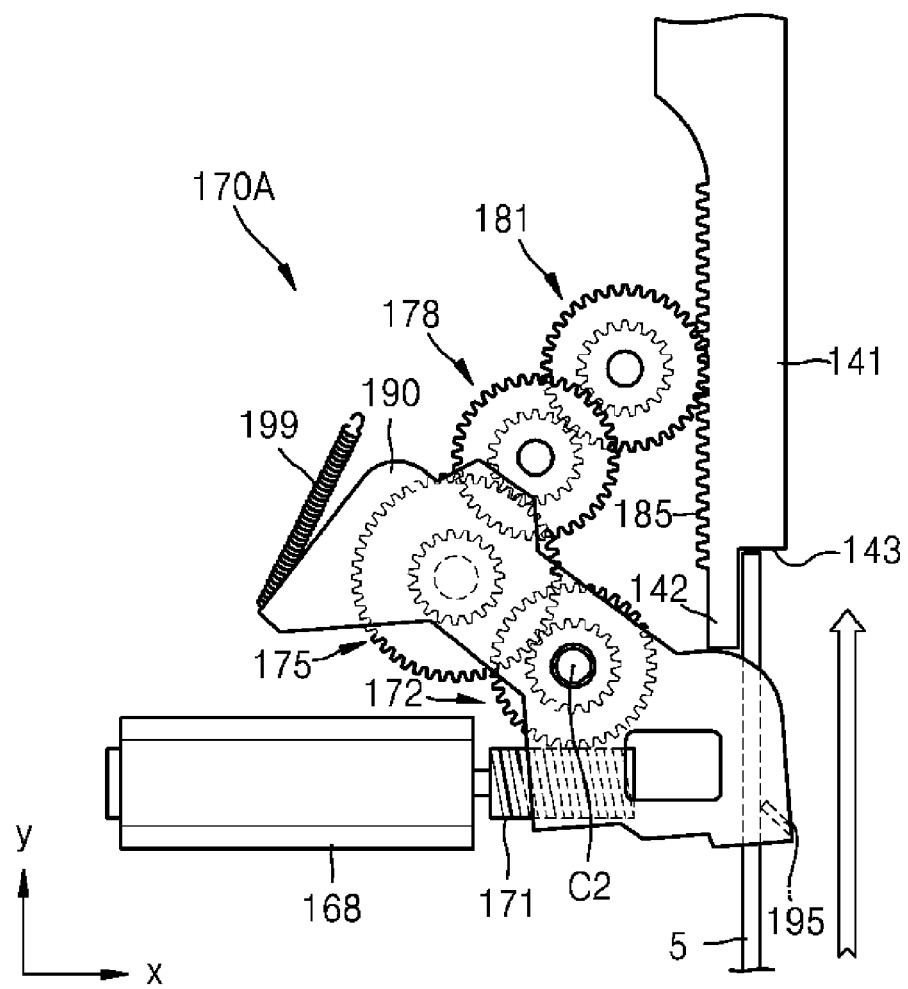

FIG. 6 shows the gear assembly 170A according to an exemplary embodiment. FIGS. 7A through 7C are plan views sequentially illustrating an operation of the gear assembly 170A of FIG. 6.

Referring to FIG. 6, the gear assembly 170A includes a worm gear 171 formed on a driving shaft of the driving motor 168, a rack gear 185 formed on the main slider 141, and first through fourth driven gears 172, 175, 178, and 181 disposed between the worm gear 171 and the rack gear 185. The gear assembly 171A further includes a gear bracket 190 supporting the second driven gear 175. The first, third, and fourth driven gears 172, 178, and 181 are supported by the second chassis 200 (see FIG. 2). A through-hole 194 is formed in the gear bracket 190 so that a shaft 174 of the first driven gear 172 passes through the through-hole 194 to be connected to the second chassis 200.

Upper gear trains 173a of the first driven gear 172 are engaged with the worm gear 171, and lower gear trains 173b of the first driven gear 172 are engaged with lower gear trains 176b of the second driven gear 175. Upper gear trains 176a of the second driven gear 175 are engaged with upper gear trains 179a of the third driven gear 178, lower gear trains 179b of the third driven gear 178 are engaged with upper gear trains 182a of the fourth driven gear 181, and lower gear trains 182b of the fourth driven gear 181 are engaged with the rack gear 185.

The gear bracket 190 is pivotably supported by the second chassis 200 (see FIG. 2). A pivot axis C2 of the gear bracket 190 and a rotation axis of the first driven gear 172 are the same, and are parallel to a rotation axis C1 of the disk D (see FIG. 3). The gear bracket 190 is pivotable between a first position (see FIG. 7A) where the first through fourth driven gears 172, 175, 178, and 181 are successively engaged with one another and a second position (see FIGS. 7B and 7C) where the engagement between the second driven gear 175 and the third driven gear 178 is released, and the gear bracket 190 is elastically biased by a spring 199 in a direction in which the gear bracket 190 is kept at the first position. The spring 199 has one end supported by a support part 201 formed on the second chassis 200 (see FIG. 2), and the other end supported by a support part 192 formed on the gear bracket 190. The second driven gear 175 supported by the gear bracket 190 is closely attached to the third driven gear 178 due to an elastic force of the spring 199.

The gear bracket 190 further includes an inclined surface 195 adjacent to the front surface 105 (see FIG. 4) of the optical disk device 100. The inclined surface 195 is formed opposite to the spring 199 with respect to the pivot axis C2. Referring to FIG. 7A, where the gear bracket 190 is in the first position, the inclined surface 195 is located in an entrance path of the pin 5, which is inserted through the eject hole 109 (see FIG. 1), to block the pin 5.

However, referring to FIG. 7B, where the pin 5 is further pushed in a positive direction of a y-axis, that is, toward the rear surface 106 (see FIG. 4), the gear bracket 190 slightly pivots counter-clockwise about the pivot axis C2 due to a compressing force of the pin 5 applied to the inclined surface 195, thereby releasing the engagement between the second driven gear 175 and the third driven gear 178. Accordingly, the main slider 141 may be independently moved in the y-direction irrespective of the rotation of the driving motor 168. Where the pin 5 is further pushed in the positive direction of the y-axis, the inclined surface 195 is removed from the entrance path of the pin 5 such that the pin 5 may be continuously moved in the positive direction of the y-axis, thereby enabling the gear bracket 190 to be kept at the second position.

Referring to FIG. 7C, where the pin 5 is further pushed, an end of the pin 5 pushes a compressing surface 143 of the end of the main slider 141, and the main slider 141 is moved to the rear surface 106 (see FIG. 4) of the optical disk device 100, that is, in the positive direction of the y-axis. As described above, the movement of the main slider 141 in the positive direction of the y-axis causes the eject lever 160 (see FIG. 4) to eject the disk D.

Figure 8:
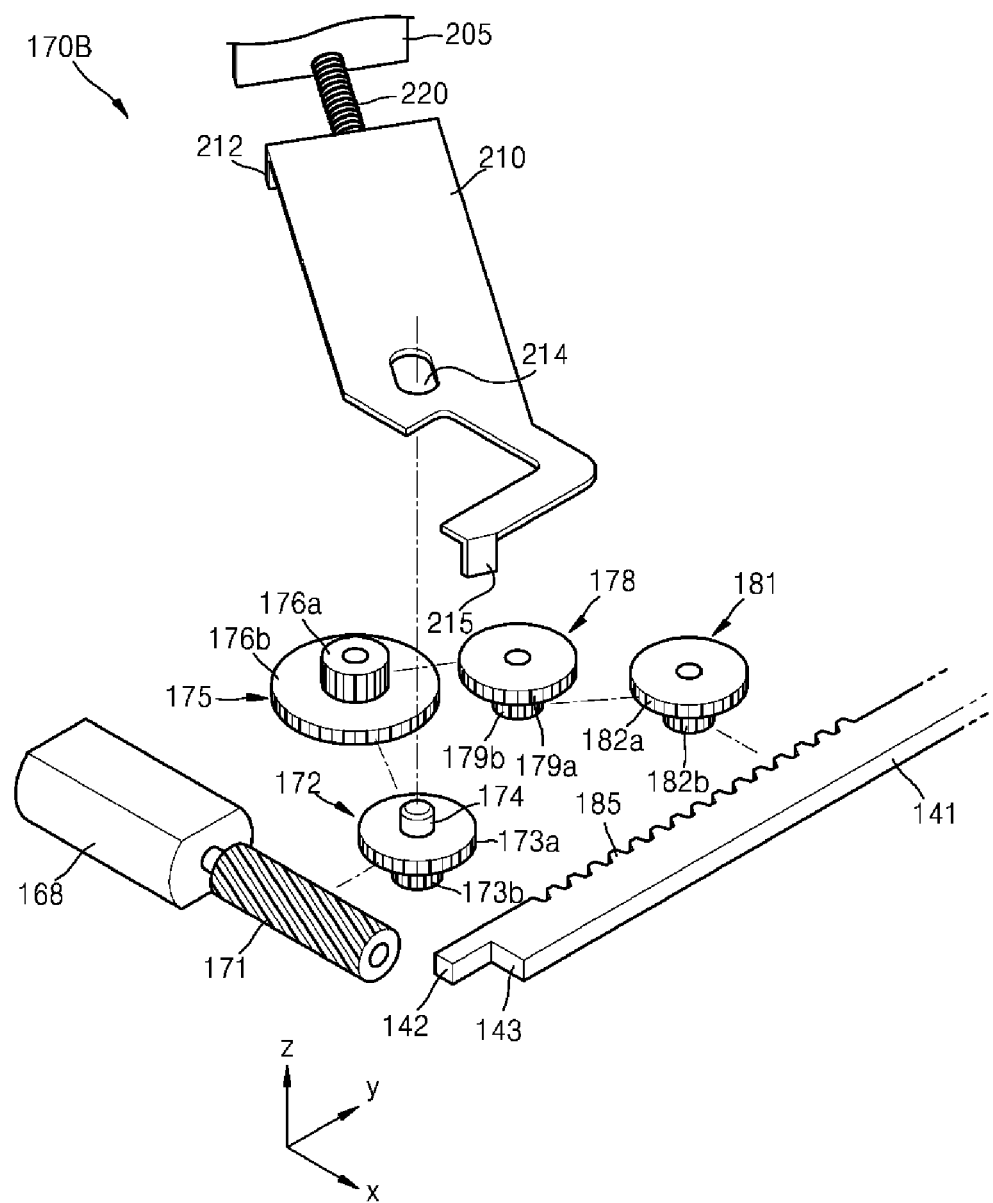
FIG. 8 is an exploded perspective view of a gear assembly according to another exemplary embodiment.
Figure 9A:
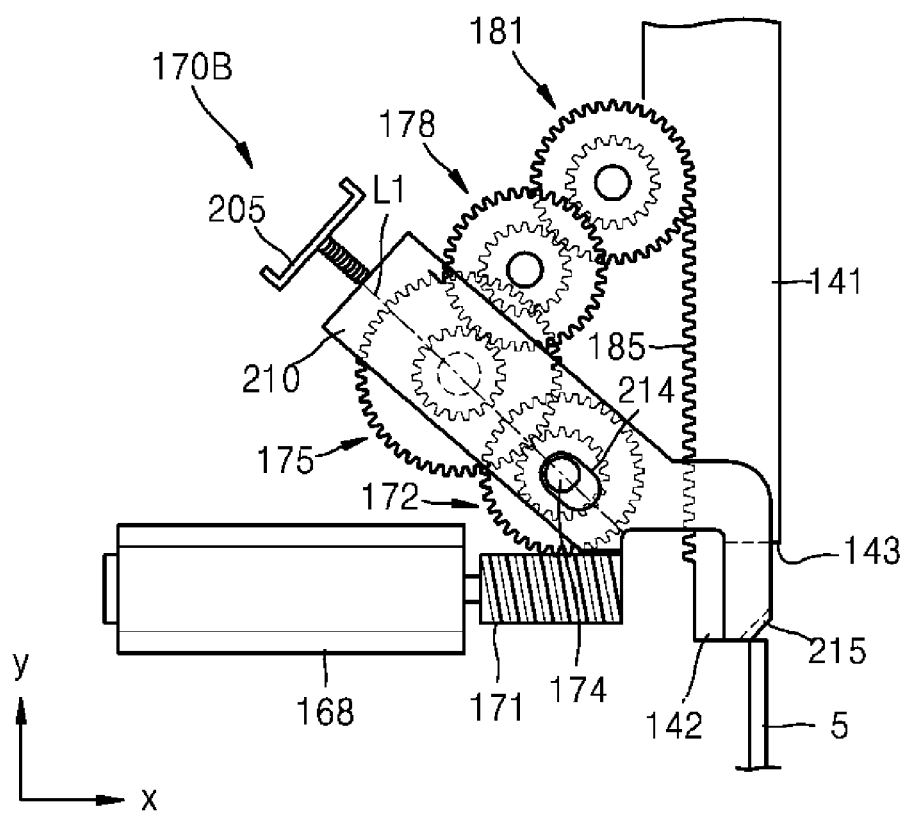
FIGS. 9A through 9C are plan views sequentially illustrating an operation of the gear assembly of FIG. 8 according to an exemplary embodiment.
Figure 9B:
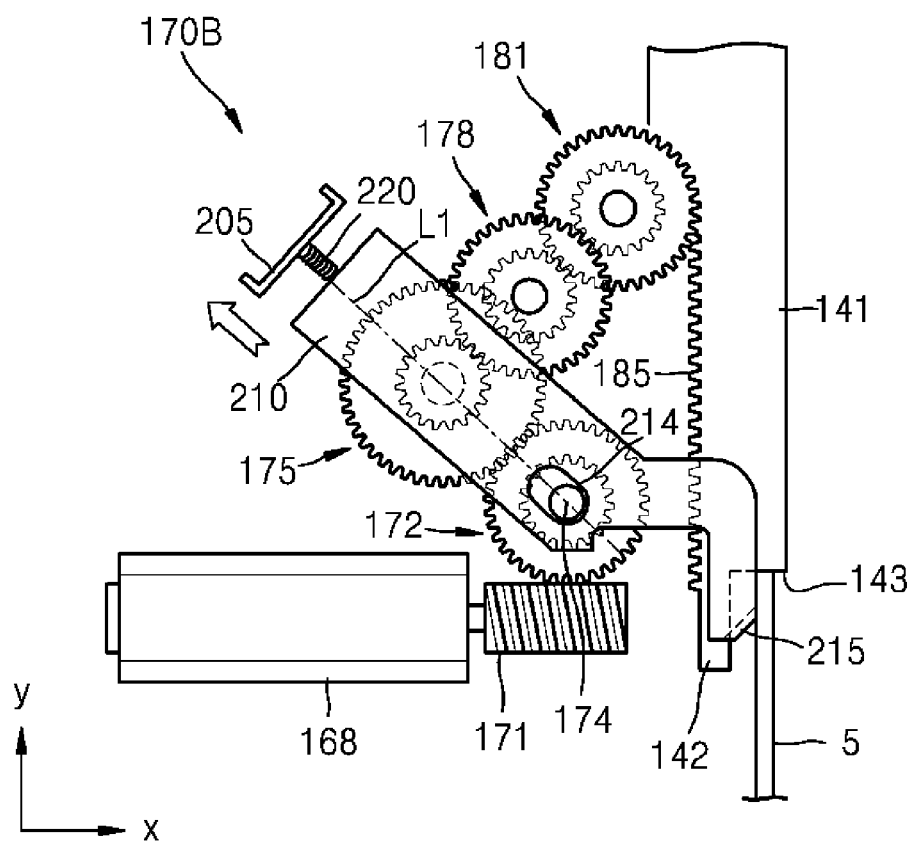
Figure 9C:
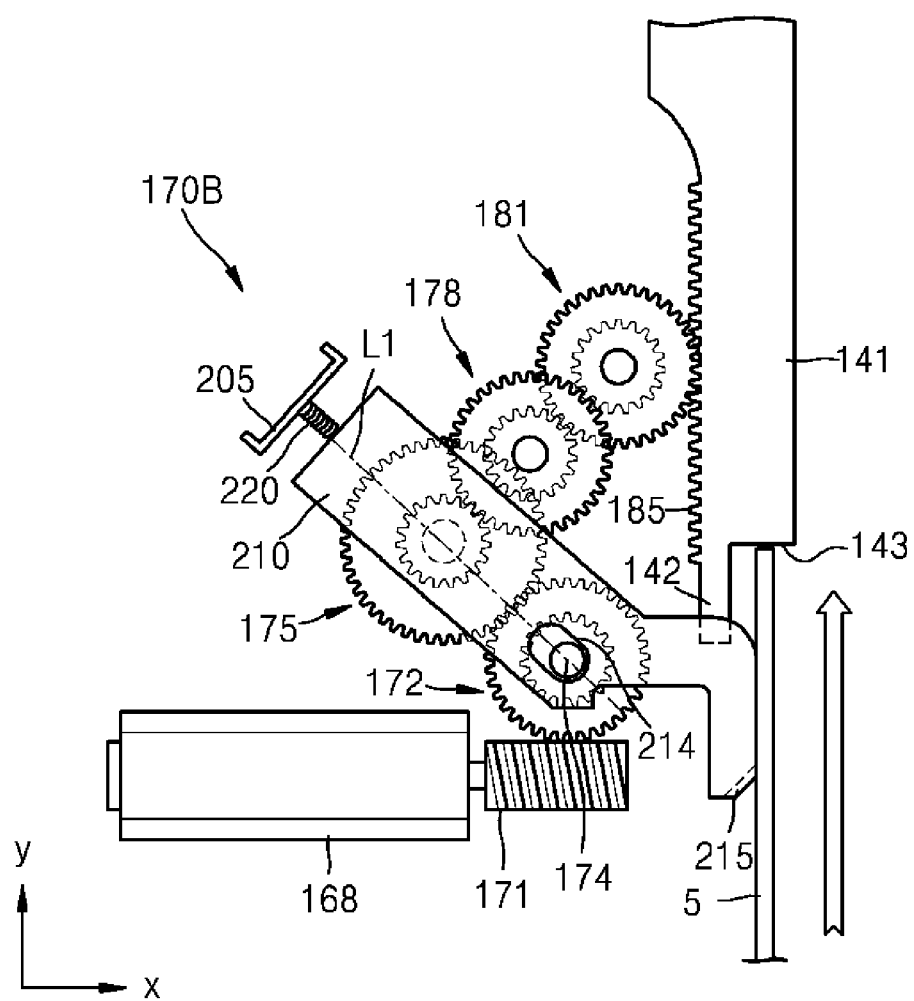

FIG. 8 is an exploded perspective view of a gear assembly 170B according to another exemplary embodiment. FIGS. 9A through 9C are plan views sequentially illustrating an operation of the gear assembly 170B. The gear assembly 170B of FIG. 8 instead of the gear assembly 170A of FIG. 6 may be installed in the optical disk device 100.

Referring to FIG. 8, the gear assembly 170B includes the worm gear 171 formed on the driving shaft of the driving motor 168, the rack gear 185 formed on the main slider 141, and the first through fourth driven gears 172, 175, 178, and 181 disposed between the worm gear 171 and the rack gear 185. The gear assembly 170B further includes a gear bracket 210 supporting the second driven gear 175. The first, third, and fourth driven gears 172, 178, and 181 are supported by the second chassis 200 (see FIG. 2). A through-hole 214 is formed in the gear bracket 210 so that the shaft 174 of the first driven gear 172 passes through the through-hole 214 to be connected to the second chassis 200. The through-hole 214 is a long hole extending in one direction so that the gear bracket 210 may be moved in parallel to the first driven gear 172.

The upper gear trains 173a of the first driven gear 172 are engaged with the worm gear 171, and the lower gear trains 173b of the first driven gear 172 are engaged with the lower gear trains of the second driven gear 175. The upper gear trains 176a of the second driven gear 175 are engaged with the upper gear trains 179a of the third driven gear 178, the lower gear trains 179b of the third driven gear 178 are engaged with the upper gear trains 182a of the fourth driven gear 181, and the lower gear trains 182b of the fourth driven gear 181 are engaged with the rack gear 185.

The gear bracket 210 is supported by the second chassis 200 (see FIG. 2) to be slidable in one direction. To this end, the gear bracket 210 may be slidably mounted on a guide (not shown) that is formed on the second chassis 200. The gear bracket 210 is translatable between a first position (see FIG. 9A) where the first through fourth driven gears 172, 175, 178, and 181 are successively engaged with one another and a second position (see FIGS. 9B and 9C) where the engagement between the first driven gear 172 and the second driven gear 175 is released, and the gear bracket 210 is elastically biased by a spring 220 in a direction in which the gear bracket 210 is kept at the first position. The spring 220 has one end supported by a support part 205 formed on the second chassis 200 and the other end supported by a support part 212 formed on the gear bracket 210. The second driven gear 175 is closely attached to the first driven gear 172, which is supported by the gear bracket 210, due to an elastic force of the spring 220.

The gear bracket 210 further includes an inclined surface 215 formed adjacent to the front surface 105 (see FIG. 4) of the optical disk device 100. The inclined surface 215 is formed opposite to the spring 220, and is inclined in a direction opposite to that of the inclined surface 195 of the gear bracket 190 of FIG. 6. Referring to FIG. 9A, where the gear bracket 210 is in the first position, the inclined surface 215 is located in the entrance path of the pin 5, which is inserted through the eject hole 109 (see FIG. 1), to block the pin 5.

However, referring to FIG. 9B, where the pin 5 is further pushed in the positive direction of the y-axis, that is, toward the rear surface 106 (see FIG. 4), the gear bracket 190 is linearly moved in a direction, which is parallel to a straight line L1 connecting rotation axes of the second driven gear 175 and the first driven gear 172, and the spring 220 is compressed, due to a compressing force of the pin 5 acting on the inclined surface 215, thereby releasing the engagement between the second driven gear 175 and the first driven gear 172. Hence, the main slider 141 may be independently moved in the y-direction irrespective of the rotation of the driving motor 168. Where the pin 5 is further pushed in the positive direction of the y-axis, the inclined surface 215 is removed from the entrance path of the pin 5 and the pin 5 may be further pushed in the positive direction of the Y axis, thereby enabling the gear bracket 210 to be kept at the second position.

Referring to FIG. 9C, where the pin 5 is further pushed, the end of the pin 5 pushes the compressing surface 143 of the end of the main slider 141 such that the main slider 141 is moved to the rear surface 106 (see FIG. 4) of the optical disk device 100, that is, in the positive direction of the y-axis. As described above, the movement of the main slider 141 in the positive direction of the Y axis causes the eject lever 160 (see FIG. 4) to eject the disk D.

According to certain embodiment(s) disclosed above, since a gear engagement of a gear assembly transmitting a driving force of a driving motor to a main slider is released by, for example, pivoting a gear bracket about an axis parallel to a rotation axis of a disk, the thickness of a disk ejecting unit may be reduced and the thickness of an optical disk device including the disk ejecting unit may be reduced.

While a pin is disclosed as being used for means for pushing a main slider (may also be referred to as a slider) of a disk ejecting unit toward a rear surface of an optical disk device, or for manually ejecting an inserted disk, it is understood that this is only exemplary and other objects may be used to push the main slider or manually eject the disk inserted into the optical disk device. As another example, an elongated rod having sufficient length that clears an ejection hole may be used for pushing the main slider of the disk ejecting unit toward the rear surface of the optical disk device, or for manually ejecting the inserted disk. That is, the means for pushing the main slider of the disk ejecting unit toward the rear surface of the optical disk device (or means for manually ejecting the inserted disk) includes a pin, but other objects may be used as means for pushing the main slider or manually ejecting the inserted disk.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A disk ejecting unit for use in an optical disk device, comprising:
   a driving motor;
   a main slider that moves linearly toward a front surface or a rear surface of the optical disk device in response to a driving force of the driving motor;
   an eject lever that is configured to engage a disk inserted into the optical disk device so as to eject the disk where the main slider is moved toward the rear surface of the optical disk device; and
   a gear assembly that is configured to transmit the driving force of the driving motor to the main slider;
   wherein the gear assembly comprises:
      a plurality of driving gears that are driven by the driving force of the driving motor; and
      a gear bracket that supports one of a plurality of driven gears, is movable between a first position in which all of the plurality of driven gears are successively engaged with one another and a second position in which an engagement between at least one pair of adjacent driven gears is released, is elastically biased in a direction in which the gear bracket is kept at the first position, and is moved to the second position by means for pushing the main slider toward the rear surface of the optical disk device.

2. The disk ejecting unit of claim 1, wherein the gear assembly further comprises:
   a worm gear formed on a driving shaft of the driving motor; and
   a rack gear formed on the main slider;
   wherein the plurality of driven gears are disposed between the worm gear and the rack gear.

3. The disk ejecting unit of claim 2, wherein the gear bracket is pivotable between the first position and the second position about an axis that is parallel to a rotation axis of the disk.

4. The disk ejecting unit of claim 3, wherein the plurality of driven gears comprise a first driven gear engaged with the worm gear and a second driven gear engaged with the first driven gear,
   wherein the second driven gear is supported by the gear bracket.

5. The disk ejecting unit of claim 4, wherein a pivot axis of the gear bracket is the same as a rotation axis of the first driven gear.

6. The disk ejecting unit of claim 5, wherein the plurality of driven gears further comprise a third driven gear engaged with the second driven gear and a fourth driven gear engaged with the third driven gear and the rack gear,
   wherein, where the gear bracket is in the second position, the engagement between the second driven gear and the third driven gear is released.

7. The disk ejecting unit of claim 2, wherein the gear bracket is translatable between the first position and the second position.

8. The disk ejecting unit of claim 7, wherein the plurality of driven gears comprise a first driven gear engaged with the worm gear and a second driven gear engaged with the first driven gear,
   wherein the second driven gear is supported by the gear bracket.

9. The disk ejecting unit of claim 8, wherein, where the gear bracket is in the second position, the engagement between the first driven gear and the second driven gear is released.

10. The disk ejecting unit of claim 2, wherein the gear bracket is elastically biased by a spring, and the spring has one end supported by a chassis that supports the main slider and the other end supported by the gear bracket.

11. The disk ejecting unit of claim 2, wherein the gear bracket comprises an inclined surface that is located in an entrance path of the pushing means where the gear bracket is in the first position, and is removed from the entrance path where the gear bracket is compressed by the pushing means toward the second position.

12. An optical disk device for recording and/or reproducing data with respect to a disk, comprising:
   a housing comprising a front surface having a slot through which the disk is inserted or ejected and an eject hole into which means for manually ejecting the inserted disk is inserted;
   a main unit comprising a turntable that is configured to rotate the disk and an optical pickup to write and/or read the data with respect to the disk; and
   a disk ejecting unit that is configured to manually eject the disk that is inserted into the housing;
   wherein the disk ejecting unit comprises
      a driving motor;
      a main slider that moves linearly toward the front surface or a rear surface of the housing in response to a driving force of the driving motor; and
      a gear assembly configured to transmit the driving force of the driving motor to the main slider; and
   wherein the gear assembly comprises
      a plurality of driving gears that are driven by the driving force of the driving motor; and
      a gear bracket that supports one of the plurality of driven gears, the gear bracket being movable between a first position in which all of the plurality of driven gears are successively engaged with one another and a second position in which an engagement between at least one pair of adjacent driven gears is released, elastically biased in a direction in which the gear bracket is kept at the first position, and moved to the second position by the ejecting means that is inserted through the eject hole.

13. The optical disk device of claim 12, wherein the disk ejecting unit comprises:
   an eject lever configured to engage the disk so as to eject the disk inserted into the housing from the housing where the main slider is moved toward the rear surface.

14. The optical disk device of claim 13, wherein the gear assembly further comprises:
   a worm gear formed on a driving shaft of the driving motor;
   a rack gear formed on the main slider; and
   wherein the plurality of driven gears are disposed between the worm gear and the rack gear.

15. The optical disk device of claim 14, wherein the gear bracket is pivotable between the first position and the second position about an axis that is parallel to a rotation axis of the disk.

16. The optical disk device of claim 15, wherein the plurality of driven gears comprise a first driven gear engaged with the worm gear and a second driven gear engaged with the first driven gear,
   wherein the second driven gear is supported by the gear bracket.

17. The optical disk device of claim 16, wherein a pivot axis of the gear bracket is the same as a rotation axis of the first driven gear.

18. The optical disk device of claim 17, wherein the plurality of driven gears further comprise a third driven gear engaged with the second driven gear and a fourth driven gear engaged with the third driven gear and the rack gear,
    wherein, where the gear bracket is in the second position, the engagement between the second driven gear and the third driven gear is released.

19. The optical disk device of claim 14, wherein the gear bracket is translatable between the first position and the second position.

20. The optical disk device of claim 19, wherein the plurality of driven gears comprise a first driven gear engaged with the worm gear and a second driven gear engaged with the first driven gear,
    wherein the second driven gear is supported by the gear bracket.

21. The optical disk device of claim 20, wherein, where the gear bracket is in the second position, the engagement between the first driven gear and the second driven gear is released.

22. The optical disk device of claim 14, wherein the gear bracket is elastically biased by a spring, and the spring has one end supported by a chassis that supports the main slider and the other end supported by the gear bracket.

23. The optical disk device of claim 14, wherein the gear bracket comprises an inclined surface that is located in an entrance path of the ejecting means that is inserted through the eject hole where the gear bracket is in the first position, and is removed from the entrance path where the gear bracket is compressed by the ejecting means toward the second position.

24. A disk ejecting unit for use in a disk device for recording and/or reproducing data with respect to a disk, the disk ejecting unit comprising:
    a driving motor;
    a slider that moves toward a first position or a second position in response to a driving force of the driving motor, and toward the second position in response to being manually moved;
    an eject lever that is configured to engage the disk inserted into the disk device so as to eject the disk where the slider is moved toward the second position; and
    a gear assembly that is configured to transmit the driving force of the driving motor to the slider;
    wherein the gear assembly comprises
        a plurality of driving gears that are driven by the driving force of the driving motor; and
        a gear bracket that supports one of the plurality of driven gears, the gear bracket being movable between a first position in which all of the plurality of driven gears are successively engaged with one another and a second position in which an engagement between at least one pair of adjacent driven gears is released, elastically biased in a direction in which the gear bracket is kept at the first position of the gear bracket, and moved to the second position of the gear bracket by means for pushing the slider toward the second position of the slider.

25. The disk ejecting unit of claim 24, wherein the slider is manually moved toward the second position in response to being pressed by means for pushing the slider through an eject hole provided to the disk device.

26. The disk ejecting unit of claim 24, wherein the gear assembly further comprises:
    a worm gear formed on a driving shaft of the driving motor;
    a rack gear formed on the main slider;
    wherein the plurality of driven gears are disposed between the worm gear and the rack gear.

27. The disk ejecting unit of claim 24, wherein the disk device is an optical disk device for recording and/or reproducing the data with respect to the disk, which uses a slot-loading mechanism to load or unload the disk.

28. The disk ejecting unit of claim 1, wherein the eject lever is rotatable about a fixed pivot axis which does not move during movement of the main slider.

29. A disk ejecting unit for use in an optical disk device, comprising:
    a driving motor;
    a main slider that moves linearly toward a front surface or a rear surface of the optical disk device in response to a driving force of the driving motor;
    an eject lever that is configured to engage a disk inserted into the optical disk device so as to eject the disk where the main slider is moved toward the rear surface of the optical disk device; and
    a gear assembly that is configured to transmit the driving force of the driving motor to the main slider;
    wherein the eject lever is rotatable about a fixed pivot axis which does not move during movement of the main slider.

30. An optical disk device for recording and/or reproducing data with respect to a disk, comprising:
    a housing comprising a front surface having a slot through which the disk is inserted or ejected and an eject hole into which means for manually ejecting the inserted disk is inserted;
    a main unit comprising a turntable that is configured to rotate the disk and an optical pickup to write and/or read the data with respect to the disk; and
    a disk ejecting unit that is configured to manually eject the disk that is inserted into the housing;
    wherein the disk ejecting unit comprises an ejection lever that is rotatable about a fixed pivot axis which does not move during ejection of the inserted disk.

31. A disk ejecting unit for use in a disk device for recording and/or reproducing data with respect to a disk, the disk ejecting unit comprising:
    a driving motor;
    a slider that moves toward a first position or a second position in response to a driving force of the driving motor, and toward the second position in response to being manually moved;
    an eject lever that is configured to press the disk inserted into the disk device so as to eject the disk where the slider is moved toward the second position; and
    a gear assembly that is configured to transmit the driving force of the driving motor to the slider;
    wherein the ejection lever is rotatable about a fixed pivot axis which does not move during movement of the slider.

* * * * *